Feb. 28, 1967 F. W. SANDERS 3,306,743
ELECTROPHOTOGRAPHIC COMPOSITIONS, RECORDING
ELEMENTS AND PROCESS EMPLOYING SHELLAC
Filed Dec. 12, 1962
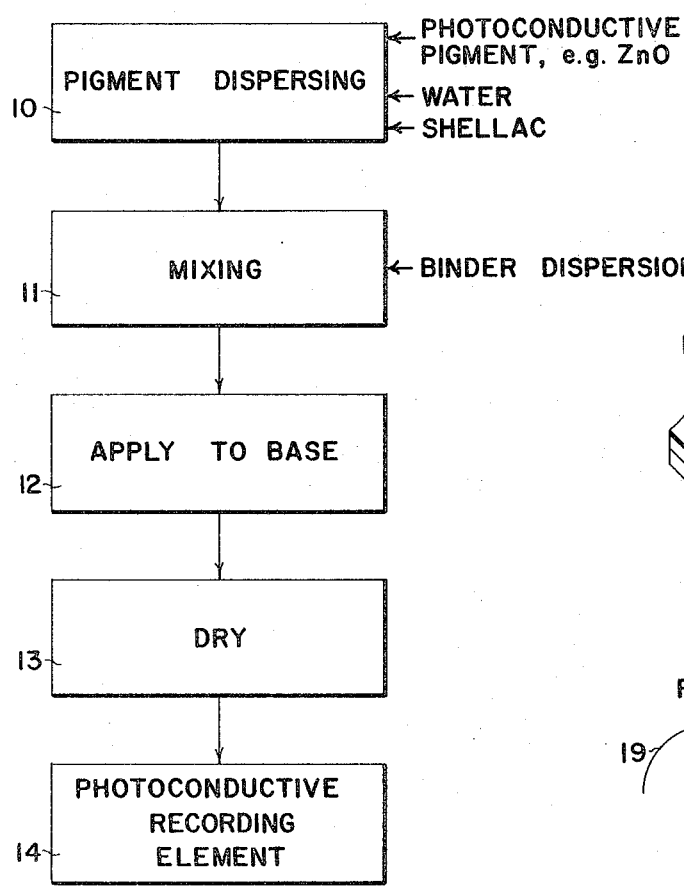
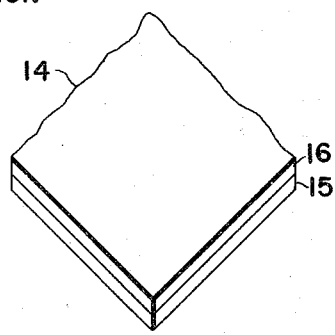
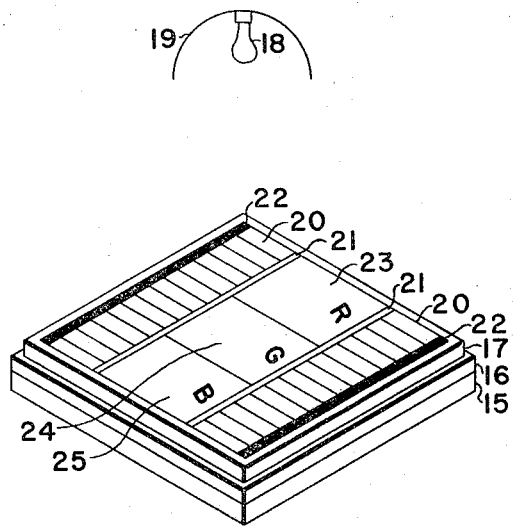
FREDERICK W. SANDERS *INVENTOR.*
BY Irvin V. Gleim

United States Patent Office 3,306,743
Patented Feb. 28, 1967

3,306,743
ELECTROPHOTOGRAPHIC COMPOSITIONS, RECORDING ELEMENTS AND PROCESS EMPLOYING SHELLAC
Frederick W. Sanders, Chillicothe, Ohio, assignor to The Mead Corporation, Dayton, Ohio, a corporation of Ohio
Filed Dec. 12, 1962, Ser. No. 244,213
12 Claims. (Cl. 96—1.8)

This invention relates to improved compositions and processes for producing electrophotographic recording elements, and to the elements so produced. More particularly, the invention relates to compositions, processes and products derived from or utilizing aqueous systems, and to novel dispersing, stabilizing and sensitizing materials for use therein.

In the art of producing images by electrophotographic methods, a base material such as paper or the like is provided with a photoconductive surface layer which generally comprises a photoconductive pigment and an insulating binder. Such surface layers are adapted to hold electrostatic charges in the dark but those portions receiving light become conductive and permit the electrostatic charge to leak away and thus result in charged images which are later made visible by development with electroscopic particles of colored material.

Electrophotographic layers of the prior art involve the use of various kinds of binders for holding various kinds of photoconductive pigments as coating layers on backing members. Such binders are exemplified by hydrocarbon resins, vinyl acetate resins, styrene-butadiene resins, polyacrylic acid resins, and the like. The binders generally fall into either one of two classifications as follows: First, polymers soluble in water or in water to which enough alkali has been added to neutralize the acid groups on the resin, and secondly, polymers insoluble in water or in dilute alkali. The polymers in this second class are used either as organic solutions or dispersions or as aqueous dispersions or latices.

These prior art materials all suffer to some degree from several common disadvantages which make them not completely suitable for high quality electrophotographic reproduction. For example, water soluble materials are hygroscopic and, at high relative humidities, electrostatic charges leak off too rapidly to make acceptable electrophotographic printings. On the other hand, water insoluble polymers must be used either as solutions or dispersions in organic solvents, or as aqueous dispersions or latices. The high cost of organic solvents, as compared to water, and the attendant fire and/or toxicity hazards make the use of otherwise acceptable organic solvent systems unattractive from economic and manufacturing viewpoints.

Aqueous systems based on polymer latex binders avoid the hazards and high cost of organic solvent systems, but encounter other problems which, until the present invention, severely limit their use in producing acceptable electrophotographic recording elements. Polymer latex binders are colloidal systems which, under adverse conditions, are coagulated or gelled into unusable, thick, doughy or crumbly masses. Such latices have little or no stability in the presence of multi-valent metal ions, and they present major stability problems when compounded with reactive pigments such as, for example, zinc oxide.

Likewise, the photoconductive pigment component of electrophotographic compositions presents problems of producing stable, low viscosity dispersions which are sufficiently free of electrically conductive dispersing agents to be useful in electrophotography. While many excellent pigment dispersing agents are known, most are ionic in character, and result in electrophotographic layers which are deficient in charge holding capacity due to the conductivity of the pigment dispersing agent. Examples of such unsatisfactory pigment dispersing agents are the various polyphosphates.

Another problem involved in the making of preferred electrophotographic recording elements lies in the limited spectral sensitivity of the photoconductor used. Because of its low cost, availability and white color, photoconductive zinc oxide is a preferred pigment for making electrophotographic recording elements. However, zinc oxide shows its maximum photo-response (at room temperature) in the range of 3600 to 3800 Angstroms with an extremely small response above 4200 Angstroms. Thus, zinc oxide has little or no photo-response to visible light (4000 to 7000 Angstroms) and tungsten incandescent light sources are generally not suitable for imaging electrophotographic layers utilizing zinc oxide. The prior art teaches a number of approaches to extend the photo-response of zinc oxide into the visible spectrum, principally by the use of various dyes such as para-rosaniline. An objection to dye sensitization is the pronounced tint or color imparted to the photoconductive layer.

According to the present invention, it is possible to overcome these deficiencies of the prior art to a highly significant degree. The novel materials of the present invention are highly effective dispersing agents for zinc oxide and/or other photoconductive pigments, have a pronounced stabilizing effect on polymer latex binders, and broaden the photo-response of zinc oxide well into the visible light range. The novel dispersing, stabilizing and sensitizing materials of this invention are shellac products which are refined products derived from the secretion of the lac insect.

Although not well characterized chemically, an approximate composition for shellac is

| | Percent |
|---|---|
| Petroleum soluble wax-like ester | 3 |
| Aleuritic acid | 30 |
| Water soluble aldehydic acids | 20 |
| Water soluble hydroxy dibasic acids (which may include shellolic acid) | 20 |
| Low melting hydroxy monobasic acids sparingly soluble in water and probably having a cyclic structure, but no ethenoid unsaturation | 25 |

The details of how the various acids are combined to form the shellac resin are unknown at present. In commerce, the excretions of the lac insect are collected as encrustations on the branches and twigs of the trees which serve as the host for the insects. This product, known as sticklac, is crushed, ground, screened and washed to remove dirt, woody matter, the skeletal remains of the insects and a portion of the coloring matter or dye, yielding a product called seedlac. Seedlac may be further refined by various means to remove additional coloring matter and/or the waxy components, yielding a range of products, all called shellac, but with appropriate grade designations. Of particular interest as the shellac products of this invention are dewaxed orange shellac or dewaxed bleached shellac, which differ mainly in the amount of color remaining in the product. These products are generally insoluble in non-polar solvents but are soluble or swell in polar solvents, and may be dissolved in water containing a small amount of alkali.

It has been found that these shellac products are highly effective as dispersing agents for zinc oxide. The addition of 1%, dry basis of shellac as an aqueous solution containing a small amount of ammonia changes a stiff, mud-like mass of zinc oxide and water (1:1 ratio) into a free-flowing, stable dispersion. Furthermore, addition of a relatively small amount of ammoniacal shellac solution to a copolymer binder latex prior to admixture of the binder latex with a dispersion of reactive pigment stabilizes the resultant pigment-binder composition, effectively preventing viscosity build-up or gelation for periods up to a year or more. If the reactive pigment dispersion contains shellac, even in a relatively small amount, it is not necessary to add shellac to the copolymer latex binder prior to its admixture with the pigment dispersion, and the same stabilizing effects are noted, i.e., the pigment-binder composition has a stable viscosity which remains virtually unchanged for extended time periods of up to a year or more. Concomitantly, it has been discovered that the use of shellac in small amounts in electrophotographic compositions extends the photo-response of photoconductive zinc oxide well into the visible spectrum, while at the same time increasing the photo-response of the zinc oxide in the region of its photoconductivity. Thus, the present invention provides materials which are: first, effective dispersing agents for photoconductive pigments; second, effecitve stabilizing agents for copolymer latex binders; and third, effective sensitizers to increase the photoresponse of photoconductive layers prepared according to the invention.

Accordingly, it is an object of the present invention to provide electrophotographic compositions of improved stability.

Another object is to provide improved photoconductive recording elements sensitive to a widened range of light wave lengths.

An additional object is to provide an improved method for making photoconductive recording elements.

Yet another object is to provide methods and materials for making photoconductive recording elements which avoid the use of volatile organic solvents and their attendant fire and/or toxicity hazards.

Still other objects will become apparent from the description which follows, together with the attached drawings and claims which form a part hereof.

In the accompanying drawings illustrating the invention, in the several figures of which like parts are similarly designated, FIGURE 1 is a flow diagram showing one embodiment of the process of this invention, FIGURE 2 is a diagrammatic perspective view, partly broken away, of a photoconductive recording element according to the invention, and FIGURE 3 is a diagrammatic perspective view illustrating the method for evaluating the photo-response of the photoconductive layers of the invention.

Referring now to FIGURE 1, the flow diagram indicates the various process steps for making photoconductive recording elements according to the invention. A photoconductive pigment, such as photoconductive zinc oxide, is dispersed in water in the presence of a small amount of ammoniacal shellac solution as indicated at 10. This step is followed by mixing of the pigment dispersion with an appropriate amount of a binder dispersion or solution, such as a copolymer latex binder, as shown at 11. The resulting electrophotographic coating composition is then applied to a base such as a web of paper and the like, as shown at 12, followed by drying to remove the aqueous vehicle therefrom as indicated at 13 to yield a photoconductive recording element 14.

As shown in FIGURE 2, the photoconductive recording element 14 comprises a base member 15 having a photoconductive layer on at least one surface thereof as indicated at 16.

The subject matter of FIGURES 1 and 2 is set forth in greater detail in the description and examples which follow.

DISPERSION OF PHOTOCONDUCTIVE PIGMENTS

In the following examples, which demonstrate pigment dispersing action of shellac, aqueous shellac solutions were prepared as follows:

|  | Solution A, parts | Solution B, parts |
|---|---|---|
| Water | 85 | 85 |
| Dewaxed Orange Shellac | 15 | |
| Dewaxed Bleached Shellac | | 15 |
| Ammonia (28%) | 1.5 | 1.5 |

The ingredients are mixed together and heated with gentle mixing to 140° F., whereupon the shellac dissolved to yield a free-flowing solution which exhibited a depth of reddish color dependent on the starting material, i.e., bleached shellac yielded a lighter colored solution than orange shellac. After cooling, the above solutions A and B had a solids content of 14.8% and were used as dispersing agents for photoconductive zinc oxide pigments as set forth in Examples 1–4.

*Example 1*

100 parts of a photoconductive zinc oxide pigment (Florence Green Seal #8, manufactured by New Jersey Zinc Company) were mixed with 100 parts of water (total hardness 200 p.p.m. as $CaCO_3$) and a very slight amount of 28% ammonium hydroxide (about 0.1 to 0.4 part). A stiff, mud-like paste resulted, to which was added 6.75 parts of shellac solution A. After mixing the solution A with the paste, a free-flowing dispersion resulted.

*Example 2*

Example 1 was repeated, except that 6.75 parts of shellac solution B were used. Here again, the addition of the shellac solution resulted in a free-flowing dispersion.

*Example 3*

Example 1 was repeated, except that 100 parts of AZZO #66 zinc oxide (manufactured by American Zinc Company) were used in place of the Florence Green Seal #8 zinc oxide, and with the same results as found for Example 1.

*Example 4*

Example 2 was repeated, using AZZO #66 zinc oxide in place of Florence Green Seal #8, and with the same results as found for Example 2.

*Example 5*

A stiff, mud-like paste of Florence Green Seal #8 zinc oxide was made as set forth in Example 1. To establish that the marked change to a free-flowing dispersion occurring on the addition of either shellac solution was not merely due to dilution effects from the water in the shellac solutions, 6.75 parts of water were added to the zinc oxide paste in one instance, and 6.75 parts of water containing ammonium hydroxide at the same concentration as that used in preparing the shellac solutions was added in another instance. In each instance the paste-like properties of the zinc oxide-water mixture were almost unchanged. As a matter of interest, the paste-like character of the zinc oxide-water mixture was still evident, even though a total of 50 parts of water, or water containing ammonia were added to the mixture. This example shows that shellac has a very marked dispersing action on zinc oxide.

Example 6

A charge of 750 parts of zinc oxide (AZZO #66) was placed in a Z bar kneader with 225 parts of water. After kneading for ½ hour, 512 parts of water were added and the pH was adjusted to about 8.5 with 26% ammonium hydroxide. The charge showed a heavy, paste-like consistency, but was converted to a free-flowing dispersion by the addition of 51 parts of a 14.8% solids solution of bleached dewaxed shellac, equivalent to 7.5 parts (dry basis) of shellac.

Example 7

To a mixing vessel was charged 600 parts of distilled water, 2 parts of 26% ammonium hydroxide and 63 parts of a 20% solids (dry basis) ammoniacal solution of bleached dewaxed shellac. Next, 900 parts of AZZO #661 zinc oxide (American Zinc Company) were added slowly with agitation just sufficient to prevent settling of lumps of zinc oxide. Mixing was continued for 30 minutes after the last of the zinc oxide had been added, after which the fluid slurry was passed through a colloid mill having a blade clearance of 0.04 inch. In this example, the mixture remained free-flowing at every stage of its preparation.

Example 8

| | Parts |
|---|---|
| Ammoniacal dewaxed orange shellac solution (20% solids) | 333 |
| Water | 334 |
| Zinc oxide (AZZO #661, American Zinc Company | 333 |

The above were mixed in order in a vessel provided with a propeller type agitator, and then passed through a colloid mill having a blade clearance of 0.02 inch. Under these conditions, there was little or no temperature rise during colloid milling, and the resultant dispersion was a low viscosity liquid which was stable over a time period of several months.

STABILIZATION OF BINDERS

As pointed out supra, many binder materials otherwise suitable for making photoconductive layers are unstable in the presence of reactive pigments. The prior art shows many protective colloids and surface active agents which will reduce or prevent the coagulating action of reactive pigments on binder emulsions and/or dispersions. Most of these also severely reduce or prevent the accumulation of a static charge on the surface of a resin film deposited in the presence of these protective materials. At best, in electrophotographic applications, the charge holding ability of the film surface is limited by hygroscopic effects or temperature specific to the protective agent used.

Ideally, a suitable protective agent is also an excellent electrical insulator in systems for use in electrophotography based on a matrix in which a photoconductor, such as zinc oxide, is bonded by or embedded in an electrically resistant resin film. It is also highly desirable that the protective action and electrical properties be accompanied by insolubility in non polar solvents such as those used for liquid development in electrophotography, where particles, capable of attraction to or repulsion from a static charge on the surface of an electrophotographic matrix, are suspended in a dielectric, essentially non polar fluid.

It has been found that the shellac products of this invention have the properties of first, a highly effective stabilizing action on aqueous polymer binder systems, second, high electrical resistance and/or charge holding ability, third, insolubility in polar liquids used in electrophotographic developer systems, fourth, are relatively non-hygroscopic, and finally, are relatively insensitive to temperature in the range normally encountered. Thus these shellac products in great measure meet the criteria for an ideal stabilizing agent for aqueous polymer binder systems, and indeed, this utility extends beyond systems adapted to electrophotography.

In this connection it is noted that there are many resin emulsions or latices which contain ingredients so highly conductive as to be wholly unsuited for use in electrophotography. However, even these may be improved in stability to such an extent that after ageing for a period extending over a year, the zinc oxide shellac stabilized resin composition had merely settled somewhat to a very soft mud capable of redispersion by gentle stirring. Such aged compositions have been found suitable for use as coatings for paper, plaster, wood, many metals, fabrics and other surfaces and exhibit the brightness, mold and fungus resistance which is characteristic of zinc oxide pigmented coatings. Since shellac is available in approved pharmaceutical grades, it may be used to stabilize resins dispersions approved by the Food and Drug Administration for coatings on food packaging and/or processing materials.

It has been observed that many resin dispersions which are sufficiently stable as marketed to allow intimate admixture with a zinc oxide slurry have scarcely enough charge holding ability to make a detectable electrophotographic print at 50% R.H. Such dispersions are improved electrically to a useful degree by stabilizing the resin additionally with either bleached or unbleached shellac. Further by the additional stabilizing action of the shellac such dispersions may be mixed wtih zinc oxide at higher total solids.

Also, resin dispersions have been prepared in which alkali solubilized shellac has been the sole stabilizer. These have shown excellent stability with zinc oxide slurries, some even without predispersing the zinc oxide with more shellac.

The present invention thus encompasses those polymer dispersions which are stabilized in aqueous media by particle size reduction to essentially Brownian size or near Brownian size so that settling and coalescence is prevented by the smallness of the resin particle and its non tacky surface, particles stabilized during manufacture of the polymer dispersion by the presence of shellac in water solution during polymerization, and polymer dispersions stabilized by colloids and/or surface active agents during manufacture which are subsequently additionally stabilized by the alkaline shellac solutions of this invention, as shown in Examples 9–25.

Example 9

This example shows the coagulating effect of a reactive pigment, zinc oxide, on a copolymer latex.

To 50 parts of zinc oxide (Florence Green Seal #8 from New Jersey Zinc Company) dispersed in 80 parts of water containing a small amount of ammonia were added 30 parts (49.3% solids) of a particle stabilized styrene-butadiene latex (Dow Latex X3313 manufactured by the Dow Chemical Company). Almost immediately thickening was observed so an additional 25 parts of water were added. However, the latex agglomerated and the mix set to a lumpy, mud-like state.

Example 10

A zinc oxide dispersion was prepared by taking 80 parts of water, 50 parts of zinc oxide (Florence Green Seal #8) and 6 parts of ammoniacal shellac solution containing 14.3% solids (dry basis), mixing these ingredients together and screening. To this zinc oxide dispersion was added 30 parts (49.3% solids) of Dow Latex X3313 with mild agitation. A free-flowing composition resulted which did not increase in viscosity over a 24-hour period.

Example 11

50 parts of zinc oxide (Florence Green Seal #8) was added to 80 parts of water and the pH adjusted to 8.5 with ammonia. Upon mixing, a fairly good slurry resulted. Next, 30 parts (49.3% solids) of Dow Latex X3313 was brought to a pH of 9.0 with ammonia and 6 parts of ammoniacal shellace solution containing 14.3% solids (dry basis) were mixed in and the so-treated latex allowed to stand for several hours. The stabilized latex was then mixed into the zince oxide slurry yielding a fluid, viscosity stable composition.

*Example 12*

A zinc oxide pigment dispersion was prepared by mixing, in the order listed,

|   | Parts |
|---|---|
| Water | 1332 |
| Ammonium hydroxide (15%) | 5 |
| Ammoniacal shellac solution (19.3%) | 140 |
| Zinc oxide (Florence Green Seal #8) | 2000 |

The slurry was passed through an Eppenbach colloid mill and screened through a 100-mesh screen.

Next, a stabilized latex was prepared by mixing, in the order listed,

| | |
|---|---|
| Styrene-butadiene latex (Dow Latex X3313) (49.3% solids), parts | 142 |
| Water, parts | 50 |
| Ammonium hydroxide (28%) | To pH of 8.0–8.5 |
| Ammoniacal shellac solution (19.3%), parts | 3.6 |

This mixture was allowed to stand overnight before use.

Upon mixing 100 parts of the zinc oxide dispersion with 31.7 parts of the stabilized latex, a stable free-flowing composition resulted. A portion of the composition was placed in a sealed container and stored for one year. While there had been some settling of pigment during this storage period, simple stirring restored the composition to its original condition.

*Example 13*

The procedure of Example 12 was followed, except that the particle-size stabilized styrene-butadiene latex (Dow Latex X3313) was replaced with a like amount of an anionic styrene-butadiene latex (Dow Latex 512L) with comparable results.

*Example 14*

The procedure of Example 12 was followed, except that a like amount of a styrene-butadiene-itaconic acid terpolymer latex (Dow Latex 630) was substituted for the Dow Latex X3313, with comparable results.

*Example 15*

The procedure of Example 12 was followed, except that a like amount of polyvinylacetate latex (Duracet M produced by Franklin Chemical Company) was used in place of the Dow Latex X3313, with comparable results.

*Example 16*

A styrene-butadiene latex was prepared by adding ammoniacal orange shellac solution to the aqueous phase, followed by introduction of a peroxide catalyst, styrene monomer and butadiene monomer in the ratio of 60 parts of styrene and 40 parts of butadiene then added. After the polymerization reaction had proceeded to the desired degree, a stable copolymer resin latex resulted.

In this example, the amount of orange shellac used amounted to 10% of the weight of the monomers. Total solids content of the latex was 35%. In preparing this latex, the processing steps generally followed the known methods of emulsion polymerization, except that the conventional emulsifying agent was replaced by orange shellac, which functioned as the polymerization emulsifier and stabilizer.

Next a zinc oxide slurry was prepared by taking 80 parts of water to which were added 50 parts of zinc oxide (Florence Green Seal #8) and the pH adjusted to 8.5 with ammonia. Upon mixing in a heavy duty mixer, a viscous slurry was obtained.

To the zinc oxide slurry were added 42 parts of the shellac-stabilized butadiene-styrene copolymer latex described supra, giving a ratio of 1 part of latex to 3 parts of zinc oxide, dry basis. After mixing, a free-flowing composition resulted which exhibited stable viscosity characteristics over a period of several months.

*Examples 17–25*

In all these examples, the procedure of Example 12 was followed, substituting the designated latex for the latex of Example 12.

| Example | Latex | Trade Name | Source |
|---|---|---|---|
| 17 | Hydrocarbon Resin | Piccopale A20 | Pennsylvania Industrial Chemical Corp. |
| 18 | ____do____ | Piccopale A22 | Do. |
| 19 | Acrylic Resin | X52 | Rohm and Haas. |
| 20 | ____do____ | 200 | Do. |
| 21 | ____do____ | 201 | Do. |
| 22 | Carboxyl-Containing Acrylic | Ubatol 2007 | A. E. Staley Mfg. Co. |
| 23 | ____do____ | Ubatol 7001 | Do. |
| 24 | ____do____ | Polyco X134 | The Borden Company. |
| 25 | ____do____ | Polyco 27-14 | Do. |

The compositions obtained in Examples 17–25 were all free-flowing, and stable in viscosity characteristics over extended time periods.

In addition, the copolymer and terpolymer latex binders for photoconductive pigments disclosed in copending U.S. patent application S.N. 183,027, filed March 28, 1962, may be stabilized effectively by the shellac products of this invention.

PHOTO-SENSITIZING OF PHOTOCONDUCTIVE PIGMENTS

As noted supra, it has been discovered that the shellac products of this invention broaden or extend the photoresponse of certain photoconductive pigments well into the visible spectrum. This action of shellac products has been determined by procedures based on the anticipated use of photoconductive compositions as surface layers on electrophotographic recording elements, the procedures following the steps normally taken in charging, imaging and development of such elements.

While more precise scientific methods are known for measuring the spectral sensitivity of photoconductive materials, the incorporation of photoconductive pigments in a matrix, in association with binders of various types, and with other additives present, may alter the scientifically measured photo-response of the photoconductive pigment. It is for this reason that the procedures here described were developed to indicate the actual performance of photoconductive layers in the form and by the steps actually used in commerce.

According to the procedure used in this invention, aqueous photoconductive compositions are prepared which comprise a photoconductive pigment and a binder therefor, together with appropriate additions of dispersing, stabilizing and sensitizing amounts of shellac products. In this work, the ratio of pigment to binder was held constant at 5:1 and the total solids of the composition adjusted to provide suitable viscosity for coating. The compositions were applied to a paper base so as to deposit 20 lb. of solids per 3000 square feet of paper surface. Although paper was used in the examples to be described later in this section, other bases or supports may be used, such as metal, plastic, textiles and the like. The coated sheets were dried at 105° C., and were then exposed to an atmosphere of about 50% R.H. at 75° F. for 24 hours. Suitable base papers are bond papers which may, if desired, be surface sized with a solution of polyvinyl alcohol and starch hardened with a urea-formaldehyde condensation product. The resultant electrophotographic recording members were used to demonstrate the effect of shellac products on the photo-sensitivity of the photoconductive layer.

To complete the test procedure, the electrophotographic recording elements were given an electrostatic charge, in the dark, of 300 volts (negative) with a corona unit. The charged surface was then exposed to light under conditions of predetermined spectral energy distribution, intensity time and geometry, the exposure being made through a test imaging transparency which was in contact with the charged surface. The exposure arrangement is shown diagrammatically in FIGURE 3 wherein the base 15 with a photoconductive layer 16 on one surface thereof, and carrying a negative electrostatic charge of about 300 volts, is covered by the imaging transparency 17, and exposed by means of, for example, a tungsten filament light bulb source mounted in a hemi-spherical reflector 19. After exposure, and operating in the dark, the latent charge image on the photoconductive layer is developed with a positive toner comprising black electroscopic particles, using a magnetic brush as is well known in the art. Following development, the test image is then fused to fix it to the surface of the electrophotographic recording element.

The test imaging transparency 17 includes a number of different elements which make it possible to evaluate the photo-response of the photoconductive layer. Two Eastman step wedge gray scales 20 are positioned between aluminum strips 21 and black, infra-red transmitting tape strips 22. Intermediate to these assemblies are placed three color filters are follows: a red Eastman Wratten Gelatin Filter No. 25, shown at 23, which transmits light having a wave length from about 5900 to 7000 Angstroms; a green Eastman Wratten Gelatin Filter No. 58, shown at 24, which transmits light having a wave length from about 4700 to 6100 Angstroms; and a blue Eastman Wratten Gelatin Filter No. 47, shown at 25, which transmits light having a wave length from about 3600 to 5300 Angstroms.

The procedure calls for making test images through the test imaging transparency 17 first with tungsten filament illumination 18, as shown in FIGURE 3, followed by making a second test image using a strobe light source in a reflector housing, in place of the tungsten filament lamp. The tungsten filament lamp emits light having a spectral energy distribution which is low in the blue end of the spectrum and high in the yellow and red region, whereas the strobe light source has a spectral energy distribution high in the ultra-violet, blue and green regions of the spectrum and low in the red region.

A study of the test images made using the two different light sources yields considerable information about the photo-response of the photoconductive layer. The grey scales 20 are divided into fourteen equal steps in optical density, numbered from 1, the densest, to 14, the least dense. Thus increased reponse of the photoconductive layer would be indicated by a smaller numbered step being the last visible step developed in the test image. The total number of grey scale steps discernable in the developed image is a measure of contrast, a smaller number of visible steps indicating higher contrast and a larger number of visible steps indicating lower contrast. Similarly, light colored images, or lack of development in the areas covered by the color filters indicates photosensitivity of the photoconductive layer to light of the wave length range transmitted by the filter.

In the following examples, electrophotographic compositions were prepared using 5 parts of photoconductive pigment and 1 part of binder. Quantities of ammoniacal shellac solution were added to provide varying ratios of shellac to dry pigment, as indicated infra. In some instances, and for comparative purposes, compositions were prepared with no shellac additions. After application to one side of a suitable paper base at a constant coating weight (dry basis) of 20 lb. per 3000 square feet and drying, the resultant photoconductive recording elements were tested by the procedure set forth supra, with the following results:

| Example No. | 26 | 27 |
|---|---|---|
| Binder | (1) | (1) |
| Pigment | (2) | (2) |
| Shellac, Percent | 0 | 5 |
| Tungsten Light: | | |
| Sensitivity | 7–13 | 5–10 |
| Contrast | 6 | 4 |
| Color Response:[3] | | |
| Red | 0 | 5 |
| Green | 0 | 5 |
| Blue | 1 | 5 |

[1] Gelva C5–V16.
[2] Zinc Oxide.
[3] Relative grading, the higher number indicating the greater response.

Gelva C5–V16 is a vinyl acetate-crotonic acid copolymer used in ammoniacal solution.

In Examples 28 to 33, the photoconductive pigment was zinc oxide and the binder was a copolymer of vinyl acetate and crotonic acid, used as an ammonia solution.

| Example No. | 28 | 29 | 30 | 31 | 32 | 33 |
|---|---|---|---|---|---|---|
| Shellac, Percent | 0 | 1 | 2 | 3 | 5 | 10 |
| Tungsten Light Source: | | | | | | |
| Sensitivity | 7–13 | 7–12 | 6–11 | 5–11 | 5–10 | 5–11 |
| Contrast | 6 | 5 | 5 | 6 | 5 | 6 |
| Color Response: | | | | | | |
| Red | 0 | 1 | 2 | 3 | 4 | 4 |
| Green | 0 | 2 | 3 | 4 | 5 | 4 |
| Blue | 1 | 2 | 3 | 5 | 5 | 5 |
| Strobe Light: | | | | | | |
| Sensitivity | 7–11 | 7–11 | 6–10 | 5–10 | 5–10 | 6–11 |
| Contrast | 4 | 4 | 4 | 5 | 5 | 5 |
| Color Response: | | | | | | |
| Red | 0 | 0 | 1 | 2 | 3 | 3 |
| Green | 0 | 1 | 2 | 3 | 4 | 3 |
| Blue | 2 | 3 | 3 | 4 | 5 | 4 |

In Examples 26–33, the improved color response of photoconductive layers when using shellac is clearly demonstrated. It is further evident that the improved color response, particularly in the red and green, levels off and reaches a maximum at about 5–10% of shellac, by weight, based on the zinc oxide. It is also surprising that the response to blue light is significantly improved by shellac, even though the photo-response of zinc oxide alone is greatest in the blue end of the spectrum.

Examples 34–39 were duplicates of Examples 28–33, except photoconductive zinc sulfide was used in place of photoconductive zinc oxide.

| Example No. | 34 | 35 | 36 | 37 | 38 | 39 |
|---|---|---|---|---|---|---|
| Shellac, Percent | 0 | 1 | 2 | 3 | 4 | 10 |
| Tungsten Light: | | | | | | |
| Sensitivity | | | | | | |
| Contrast | | | | | | |
| Color Response: | | | | | | |
| Red | 1 | 1 | 2 | 3 | 3 | 0 |
| Green | 2 | 2 | 2 | 3 | 3 | 0 |
| Blue | 2 | 2 | 3 | 3 | 3 | 0 |
| Strobe Light: | | | | | | |
| Sensitivity | | 8–11 | 8–11 | 8–11 | 9–12 | |
| Contrast | | 3 | 3 | 3 | 3 | |
| Color Response: | | | | | | |
| Red | 0 | 0 | 0 | 0 | 0 | 0 |
| Green | 0 | 1 | 1 | 0 | 0 | 0 |
| Blue | 0 | 1 | 1 | 1 | 0 | 0 |

Although zinc sulfide exhibits a much lower photoconductivity than zinc oxide, the sensitizing action of shellac is plainly evident, and levels off at about 4% of shellac by weight, based on the zinc sulfide. Samples imaged with the strobe light, with most of its energy in the blue region of the spectrum, and extending into the green wave lengths show little or no color response in the red test area, as might be expected, whereas the tungsten light source, with higher energy in the red test area shows that shellac has extended the color response of zinc sulfide into the red end of the spectrum.

Similar experiments with other binders, including both soluble and copolymer latex types have shown that the sensitization of zinc oxide is not greatly affected by the type of binder used. For example the following binders have been found to have little or no effect on the sensitization of zinc oxide with shellac: styrene-butadiene latex, styrene-butadiene-itaconic acid terpolymer latex, polyvinyl acetate latex, hydrocarbon resin dispersions, acrylic polymer latices, and the carboxyl containing latices of co-pending application Serial No. 183,027, filed March 28, 1962. Each of the aforementioned polymers appears to affect the photosensitivity of zinc oxide according to the light adsorption characteristics of the particular polymer involved. For example, those polymers which adsorb in the ultra-violet and blue regions of the spectrum show a minor masking effect on the blue sensitivity of photoconductive layers containing them. The magnitude of the masking effect is low and generally limited to a portion of the spectrum, and generally is of little consequence within the range of binder contents normally used for photoconductive layers. Even though this masking effect may be observed with certain binders, the use of shellac still manifests an improved photo-response, although relative response at different wave lengths may be altered.

SUMMARY

From the foregoing, it is readily seen that the shellac products of this invention have the surprising and unexpected functions of pigment dispersion, polymeric binder stabilization and improved photo-response of photo-conductive pigments and/or layers. While dewaxed orange and waxed bleached shellac are preferred varieties, the particular grade of shellac is largely a matter of choice. Grades containing wax, and more highly colored grades, such as garnet, can be utilized if desired. For application to electrophotographic recording members, the lighter colored materials are free from objectionable color in the final product, but where color of the photoconductive layer is of little consequence, darker grades of shellac function equally as well as the lighter colored varieties.

The amount of shellac product required for effective pigment dispersion varies somewhat with the pigment used. Normally this is of the order of 1% by weight of the pigment, but can range from 0.25 to 2%. Such amounts of shellac product will also exhibit concomitant binder stabilizing action. It has been found that the sensitizing action of the shellac products increases with increasing amounts up to an effective upper limit of about 10% by weight, based on total solids content of the composition without adverse effects on dispersing or stabilizing action. Thus, the invention contemplates shellac product quantities ranging from 0.25% to 10% by weight of the photoconductive compositions and layers of this invention.

The dispersing action of shellac extends to a wide range of photoconductive pigments. While the dispersing action is somewhat variable, and is most marked with the more reactive pigments such as zinc oxide, it may be used effectively with the oxides, sulfides, selenides, tellurides and iodides of cadmium, mercury, antimony, bismuth, thallium, molybdenum, aluminum, lead or zinc, as well as with arsenic trisulfide, cadmium arsenide and lead chromate. While the exact mechanism by which the shellac products achieve free flowing aqueous dispersions of pigments is not fully understood, it is believed that the unusual combination of very high electrical resistivity coupled with the presence of polar groups in the shellac resin permits the attainment of photoconductive pigment dispersions which are eminently suited for producing photoconductive layers.

Turning now to the stabilizing action of shellac for aqueous polymeric binders, this is particularly noted in connection with copolymer latex systems, particularly those wherein the copolymer contains a proportion of acid groups, such as carboxyl groups, in the molecule. Such latex binders are described in co-pending application for patent Serial No. 183,027, filed March 28, 1962. As disclosed therein, the binders are latex copolymers of ethylenically unsaturated compounds wherein one such reactant contains a carboxyl group. Included are acidic monomers such as itaconic acid, maleic acid, acrylic acid, crotonic acid, phthalic acid, aconitic acid, citraconic acid, and other unsaturated mono- and di-basic carboxylic acids copolymerized with styrene, styrene-butadiene, styrene-polyesters, vinyl acetate, acrylic esters, vinyl acetate-vinyl stearate, acrylonitrile and other ethylenically unsaturated monomers.

The binder stabilizing action of the shellac products of this invention is not limited to the foregoing, however, and extends to certain water-soluble materials having reactive —polar groups such as polyacrylic acid, and to other copolymer latex systems which are sensitive to and/ or coagulated by the presence of metal ions or other extraneous ions which may arise from various sources, such as the water supply used in making aqueous electrophotographic compositions.

The shellac products of this invention are soluble in dilute alkali, and are generally used as ammoniacal solutions. Other volatile alkalis may be used for this purpose, without interference with the dispersing, stabilizing and sensitizing functions of the shellac products. Examples of suitable volatile alkalis in addition to ammonia, are morpholine, ethylamine, methylamine and pyridine, used alone or in combination. While shellac is soluble in fixed alkalis such as sodium hydroxide, the presence of sodium ions in the photoconductive layer imparts a measure of electrical conductivity which is deleterious to the use of such layers for image reproduction by electrophotographic methods.

While certain embodiments of the invention have been set forth in considerable detail, this has been done for the purpose of illustration and not of limitation, it being obvious that other modifications or equivalents may be employed without departing from the scope of the invention, which is defined in the appended claims.

What is claimed is:

1. An electrophotographic coating composition comprising an aqueous suspension of discrete particles of an inorganic photoconductive pigment, an electrically insulating film-forming binder therefor, and from 0.25 to 10.0% by weight dry basis of aqueous ammoniacal shellac, based on the combined weights of said pigment and said binder.

2. The coating composition of claim 1 wherein the photoconductive pigment is zinc oxide.

3. The coating composition of claim 1 wherein the binder is a copolymer selected from the group consisting of hydrocarbon resins, vinyl acetate resins, styrene-butadiene resins and polyacrylic acid resins.

4. The coating composition of claim 1 wherein 5 parts of photoconductive pigment to 1 part of binder are used.

5. A photoconductive layer comprising discrete particles of an inorganic photoconductive pigment, an electrically insulating film-forming binder therefor and 0.25 to 10.0% of shellac based on the combined weight of said pigment and said binder.

6. The photoconductive layer of claim 5 wherein said photoconductive pigment is zinc oxide.

7. An electrophotographic recording element comprising a base member and an electrophotoconductive layer on at least one surface of said base member, said electrophotoconductive layer comprising discrete particles of an inorganic photoconductive pigment, an electrically insulating binder therefor and 0.25 to 10.0% by weight of shellac, based on the combined weight of said pigment and said binder.

8. The electrophotographic recording element of claim 7 wherein said pigment is zinc oxide.

9. A process for preparing an electrophotographic recording element comprising the steps of:
 (a) dispersing discrete particles of an inorganic photoconductive pigment in water with an ammoniacal shellac solution, —
 (b) adding an aqueous binder dispersion to said pigment dispersion, to form an electrophotographic composition,
 (c) applying said electrophotographic composition to a base member to form a surface layer thereon, and
 (d) drying said layer.

10. The process of claim 9 wherein said photoconductive pigment is photoconductive zinc oxide.

11. The process of claim 9 wherein said aqueous binder dispersion is stabilized with an aqueous ammoniacal solution of shellac before combination with the said pigment dispersion.

12. The process of claim 9 wherein said aqueous binder dispersion is stabilized with an aqueous ammoniacal solution of shellac before combination with a photoconductive zinc oxide dispersion.

References Cited by the Examiner

UNITED STATES PATENTS

| | | | |
|---|---|---|---|
| 2,311,911 | 2/1943 | Swain et al. | 260—24 |
| 2,961,420 | 11/1960 | Frey et al. | 260—27 |
| 2,972,592 | 2/1961 | Brown et al. | 260—27 |
| 3,052,539 | 9/1962 | Greig. | |
| 3,052,540 | 9/1962 | Greig. | |
| 3,061,564 | 10/1962 | Zdanowski et al. | 260—27 |
| 3,159,483 | 12/1964 | Behmenburg et al. | |
| 3,219,606 | 11/1965 | Lynch | 260—27 |

J. TRAVIS BROWN, *Primary Examiner.*

C. E. VAN HORN, *Assistant Examiner.*